United States Patent [19]

Nasi

[11] 4,406,562

[45] Sep. 27, 1983

[54] ASSEMBLY NODE FOR A SPATIAL STRUCTURE AND SPATIAL STRUCTURE EQUIPPED WITH SUCH A NODE

[75] Inventor: Cesarino Nasi, Pierrefitte-sur-Seine, France

[73] Assignee: Establissements Ernest Pantz Paris, Paris, France

[21] Appl. No.: 227,348

[22] Filed: Jan. 22, 1981

[30] Foreign Application Priority Data

Jan. 23, 1980 [FR] France .............................. 80 01419

[51] Int. Cl.³ .............................................. F16B 1/00
[52] U.S. Cl. .................................. 403/347; 403/403; 403/382
[58] Field of Search ............... 403/347, 171, 176, 217, 403/205, 403, 382; 52/667

[56] References Cited

U.S. PATENT DOCUMENTS

| | | | |
|---|---|---|---|
| 481,915 | 8/1892 | Norrman | 52/667 |
| 2,868,568 | 1/1959 | Frye | 403/171 |
| 3,001,750 | 9/1961 | Hedlund | 403/219 X |
| 3,399,914 | 9/1968 | Grant | 403/171 X |
| 3,914,063 | 10/1975 | Papayoti | 403/176 X |
| 4,065,220 | 12/1977 | Ruga | 403/176 X |

FOREIGN PATENT DOCUMENTS

| | | |
|---|---|---|
| 823203 | 12/1951 | Fed. Rep. of Germany . |
| 964159 | 1/1950 | France . |
| 2034093 | 12/1970 | France . |
| 2142545 | 1/1973 | France . |
| 2166797 | 8/1973 | France . |
| 2350434 | 2/1977 | France . |
| 85985 | 7/1920 | Switzerland ........................ 52/667 |

Primary Examiner—Andrew V. Kundrat

[57] ABSTRACT

The assembly node is formed from flat elements connected together; at least one first flat element comprises a slit situated in the middle of its width, said slit being orientated in the longitudinal direction of the flat element, and at least a second flat element is engaged in this slit and passes therethrough. The first flat element extends in the longitudinal direction of the slit on each side of the second flat element; the first flat element comprises means for securing bars on each side of the second flat element in the longitudinal direction of the slit so that the transmission of forces by the first flat element on each side of the center of the node is effected essentially parallel to the longitudinal direction of the slit, through continuity of the material forming the first flat element.

17 Claims, 5 Drawing Figures

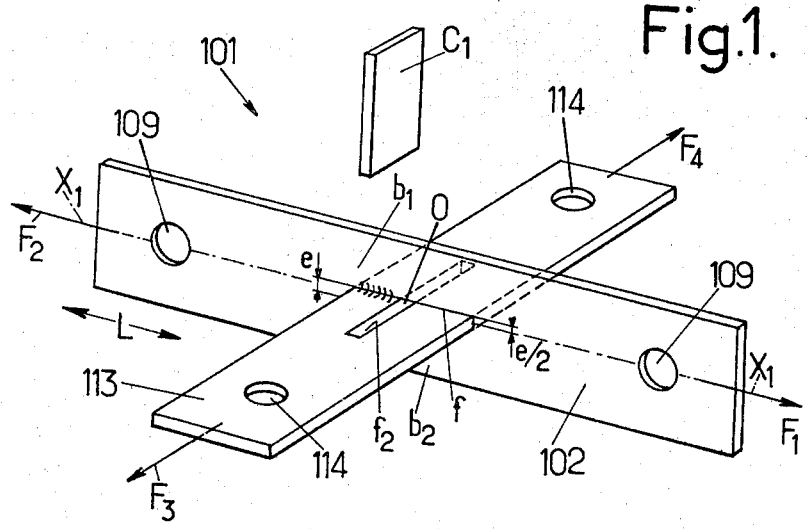
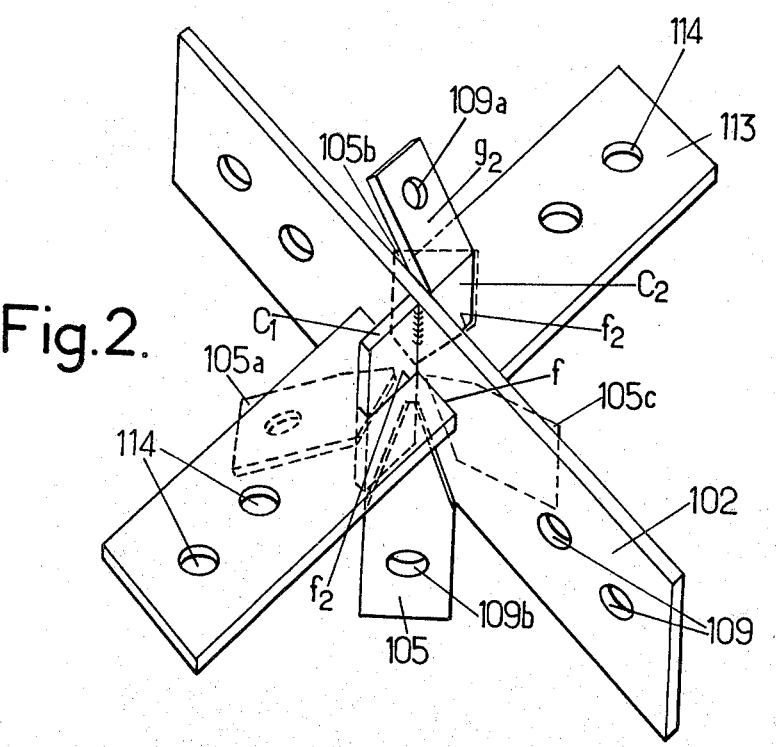

ASSEMBLY NODE FOR A SPATIAL STRUCTURE AND SPATIAL STRUCTURE EQUIPPED WITH SUCH A NODE

The invention relates to an assembly node for a spatial structure comprising at least one flat element having a slit situated substantially centrally in the width of this flat element, this slit being orientated in the longitudinal direction, and at least one other element, engaged in this slit and passing therethrough, the different elements of the node being joined together, particularly along the edges of the slit.

The purpose of the invention, especially, is to make the assembly node such that it answers better than heretofore the different requirements of practice and particularly such that the working conditions of the material are improved, that the transmission of stresses is ensured under good safety conditions and that the construction of the assembly node is simplified.

According to the invention, in an assembly node of the kind defined above, the slit is provided in the first flat element(s) so that the transmission of stresses on each side of the center of the node, along the longitudinal direction of each flat element, is ensured by continuity of the material forming these flat elements, said slit passing through the point of convergence of the different forces exerted on the node, the small dimension or width of the slit being orientated transversely to the direction of transmission of the stresses, and the other element(s) passing through the slit being formed by at least one other flat element comprising means, formed in particular by holes, for securing bars whose axis would be situated in the plane of this other flat element, on each side of said other flat element.

This first flat element may comprise a longitudinal slit closed at both its ends and whose length and width are sufficient to allow the other element to be introduced into this slit.

According to a variation, the first flat element may be formed by two elementary flat members, situated in the same plane, parallel to one another but spaced apart by a sufficient distance to allow passage of the second flat element, i.e. at least equal to the thickness of this second flat element; the slit is then formed continuously by the space separating the two elementary flat members, which may be connected at their longitudinal ends.

Advantageously, the second flat element is identical to the first one.

The second flat element may comprise, substantially in the middle of its width, a longitudinal slit closed at its ends, the length of this slit being at least equal to the width of the flat element, whereas the width of the slit is substantially equal to the thickness of said flat element; in this case, one or more keys are provided for engagement in the parts of the slit of the second flat element which extend on each side of the first flat element, these keys being intended to lock the assembly and being situated in planes substantially orthogonal to the solid angles of intersection of the dihedrons formed by the first and the second flat element.

The locking keys may comprise parts, in particular inclined, provided with coupling means for diagonal bars.

The second flat element may be formed, like the first flat element, from elementary flat members situated in the same plane, parallel to one another but spaced apart from one another; a third flat element also formed by two elementary flat members situated in the same plane may be provided for passing through the slit of the second flat element, the elementary flat members of the third flat element being situated on each side of the first flat element. The assembly node is then formed with six identical elementary flat members.

The first and the second flat elements may be orthogonal; the third flat element may also be orthogonal to the the first and to the second flat elements.

Additional flat elements provided with coupling means and having appropriate tilts may be joined to the first and second flat elements to allow coupling of diagonal bars.

Each flat element may be associated with another flat element spaced therefrom in a direction orthogonal to the plane thereof, the two flat elements being parallel and defining therebetween a space adapted to receive the end of a bar of the structure; thus is ensured coupling of the bar exactly along a direction passing through the center of the node, which avoids offsetting of the fixing of the bar with respect to this direction.

The invention also relates to spatial structures equipped with such assembly nodes.

The invention consists, apart from what has been set forth above, of certain other arrangements which will be more explicitly discussed hereafter, in connection with particular embodiments described with reference to the accompanying drawings, but which are in no wise limiting.

FIG. 1, of these drawings, shows schematically in perspective an assembly node in accordance with the invention, during construction.

FIG. 2 shows in perspective a finished assembly node.

Figure 4:
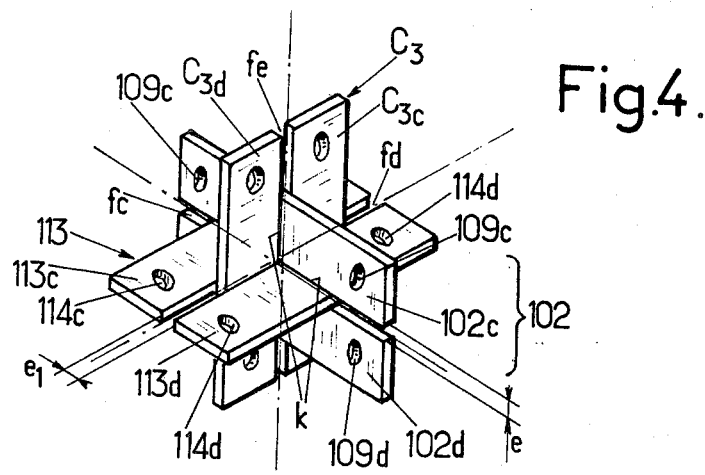
FIG. 4 shows, in perspective, another embodiment of the assembly node.
Figure 5:
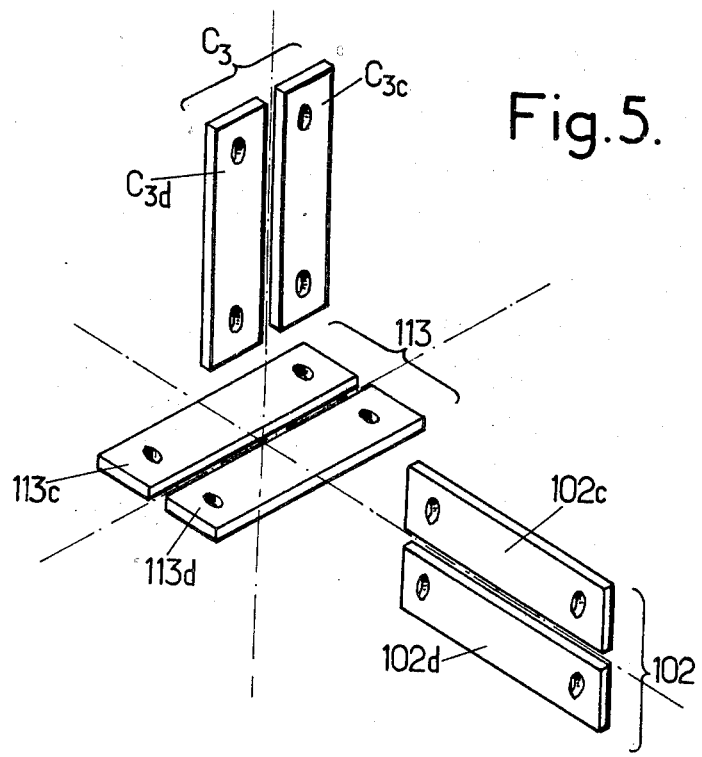

FIG. 5, finally, is an exploded view, illustrating the construction of the node of FIG. 4.

Referring to the drawings, and more particularly to FIG. 1, an assembly node 101 can be seen, for a spatial structure, under construction. This assembly node is formed by flat elements joined together or intended to be joined together when the node is finished.

Node 101 comprises at least one first flat element 102 which comprises a slit f situated substantially in the middle of the width of element 102 so as to pass through the point of convergence of the different forces which are exerted on the node mounted in the spatial structure. The longitudinal direction of slit f is orientated parallel to the longitudinal direction L of flat element 102.

Slit f is provided so that the transmission of the stresses on each side of the center 0 of the node, in the direction of flat element 102, is ensured by continuity of the material forming this element 102; strips $b_1$, $b_2$ (FIG. 1) provide this continuity of material, on each side of the slit, from one longitudinal edge of flat element 102 to the other longitudinal end.

At least a second flat element 113 is engaged in slit f and passes therethrough, this second flat element 113 comprising means, formed in particular by holes 114, for securing bars on each side of the first flat element 102.

The first flat element 102 also comprises securing means, for example formed by holes 109.

The two elements 102, 113 are joined together; in the case where the flat elements are made from steel, joining up of these elements is advantageously provided by welding along the contour of slit f, this contour forming the solid angle of intersection of the dihedrons formed by the two elements 102, 113.

The first flat element 102 extends in the longitudinal direction L, on each side of the second flat element.

The means formed by holes 109 allow bars to be secured on each side of the second flat element 113, in the longitudinal direction L of the slit, so that the transmission of the stresses, by the first flat element 102, on each side of center 0 of the node is effected essentially parallel to the longitudinal direction of slit f. The small dimension or width e of the slit is orientated transversely, practially perpendicularly, to the direction of the stresses transmitted by element 102 in the region of the center of the node.

The assembly is therefore such that the first flat element 102 and the second flat element 113 allow stresses on each side of the center 0 of the node to pass and to be transmitted in the longitudinal direction of each flat element 102, 113, without total interruption of the material of these flat elements.

The flat elements 102, 113 shown in FIGS. 1 and 2 have an elongated rectangular shape. The holes 109 are situated at the longitudinal ends of element 102 and are disposed so as to ensure coupling of bars whose mean direction is in the extension of the mean longitudinal direction of slit f, in the plane of element 102.

Holes 109 could be disposed otherwise, for example so as to allow coupling of bars whose mean directions, situated in the plane of the element, are inclined, for example by 45°, on each side of the longitudinal direction L of the slit. It is however desirable for the resultant of the forces exerted on each longitudinal end of element 102 (on each side of element 113) to be orientated in the longitudinal direction of slit f or substantially in this direction.

These remarks may also apply to element 113 whose ends could comprise a widened portion formed, for example, by lugs for securing bars in several directions in the plane of element 113.

There is shown schematically by arrows in FIG. 1 the forces F1 and F2 which are exerted at the ends of flat element 102 and the forces F3, F4 which are exerted at the ends of flat element 113. These forces are parallel or substantially parallel to the longitudinal directions of the corresponding flat elements.

It can be immediately seen that in the central region of the node it is the continuous strips of material, such as b1, b2 for flat element 102, which ensure the principal transmission of the forces. The connections, in particular welds, between flat elements 102, 113 play practically no part in the transmission of these forces.

The longitudinal slit f of the first flat element 102 may be closed at both its longitudinal ends as shown in FIG. 1. The width of this slit f is equal to or slightly greater than the thickness of the second flat element 113 so as to allow this flat element to pass into slit f.

As can be seen in FIG. 1, the longitudinal direction of flat element 113 is orientated transversely with respect to the longitudinal direction L of the first flat element 102.

The width of the second flat element 113 is orientated parallel or substantially parallel to the longitudinal direction L of the first flat element 102.

The two flat elements 102, 113 may be orthogonal, as shown in FIG. 1 and may define by their intersection four right-angled dihedrons. However, the angle formed between the planes of flat elements 102 and 113 may be different from 90°.

Slit f may be formed directly in a flat element, in the median part thereof, in the middle of the length.

According to another possibility, flat element 102 could be formed by means of two flat members, situated in the same plane, and placed so as to bear against one another along a longitudinal side X1—X1, these two flat members would then be welded to one another along this side X1—X1 which would then form the axis corresponding to the neutral fiber. In this case, before assembly of the two flat members by welding along line X1—X1, there would be formed on the longitudinal edges of each of the flat members intended to come one against the other, an aperture opening onto this longitudinal edge and having a width equal to e/2, i.e. equal to half the width of slit f; during assembly of the two flat members, these two apertures would come opposite one another, symmetrically with respect to line X1—X1, so that the slit f would thus be reconstituted after assembly of the two flat members.

According to another variation shown in FIG. 4, the first flat element may be formed by two elementary flat members 102c, 102d, situated in the same plane, parallel to one another but spaced apart by a distance e sufficient to allow the second flat element 113 to pass between these two elementary flat members. The slit or passage fc of flat member 102 is then formed in a continuous way, substantially along the whole of the length of the two elementary flat members 102c, 102d. If need be, these elementary flat members could be joined together at their two longitudinal ends. Holes 109c, 109d for securing bars are provided at the longitudinal ends of each of the elementary flat members. Holes 109c, 109d are, preferably, symmetrical with respect to slit fc.

Advantageously, the second flat element 113 also comprises a longitudinal slit f2 (FIGS. 1 and 2) situated in the middle of the width of this element. Preferably, slit f2 is identical to slit f and element 113 is identical to flat element 102. In the representation of FIGS. 1 and 2, slit f2, identical to slit f, has a length at least equal to the width of the flat element, whereas the width of the slit is at least equal to the thickness of said flat element.

Two keys C1, C2 (FIGS. 1 and 2) are then provided for engagement in the parts of slit f2 which extend on each side of the first flat element 102; these keys provide locking of the assembly and are situated in a plane orthogonal to the solid angle of intersection of the dihedrons formed by elements 102 and 113. As can be seen from FIGS. 1 and 2, keys C1, C2 pass completely through slit f2 and are formed, for example, by a rectangular element one large side of which is applied against element 102, along the width of this element. Keys C1 and C2 are coupled to flat elements 102, 113, particularly by welding, or by wedge effect or similar, along the lines of the solid angles of intersection of the different dihedrons or trihedrons formed by flat elements interlocking in each other.

It should be noted that each locking key C1, C2 may comprise a part, particularly a part such as g2, tilted with respect to the plane of the key orthogonal to the solid angle of intersection of the dihedron formed by elements 102, 113 provided with coupling means (hole 109a) for diagonal bars.

According to the variation shown in FIG. 4, the second flat element 113 is formed, like the first flat element 102, by two elementary flat members 113c, 113d situated in the same plane, parallel to one another, but spaced from one another by a distance e1, preferably equal to e, which defines a continuous slit fd. The flat members 113c, 113d pass through slit fc and are provided at their ends with securing holes 114c, 114d, preferably symmetrical with respect to slit fd.

Still according to the variation of FIG. 4, a third flat element C3 also formed (like flat elements 102 and 103) by two elementary flat members C3c and C3d situated in the same plane, but spaced from one another so as to form a continuous slit fe, is provided for passing through slit fd of the second flat element 113. The elementary flat members 102c, 102d pass through the slit fe. The flat members C3c and C3d are provided, at their ends, with holes for securing bars.

The three flat elements 102, 113, C3 may be orthogonal in twos as shown in FIG. 4.

The structure of the node thus obtained can be clearly seen in FIG. 4. The joining of the different flat members together may be provided by welding along the lines of contact such as k. It should be noted that the transmission of the forces on each side of the center of the node is ensured essentially by the continuous elementary flat elements, the welds being subjected only to negligible stresses.

FIG. 5 illustrates clearly the assembly of three pairs of elementary flat members with a view to constructing the node of FIG. 4 by translation along three orthogonal axes so as to obtain the desired interlocking of FIG. 4. It does not seem useful to further describe this FIG. 5. The assembly node of FIG. 4 may be constructed with six identical elementary flat members, resulting in an economical manufacture.

Additional flat elements such as 105 (FIG. 2) provided with securing means such as holes 109b, and having appropriate slopes are provided for securing several diagonal bars.

These flat elements 105 have their plane orthogonal or substantially orthogonal to the bisecting plane of a dihedron, especially of a dihedron formed by a key such as key C1 and flat element 102. In the representation of FIG. 2, the additional flat element 105 is engaged in a dihedron situated below flat element 113. The end of flat element 105 is limited by the straight lines of intersection between this flat element and the faces of the dihedron formed by key C1 and flat element 102; the end of flat element 105 mates with the inner surface of the dihedron and is joined to the faces of this dihedron, along the straight lines of intersection, especially by welding.

Other additional flat elements, such as 105a, 105b, 105c, similar to element 105, may be provided in the other dihedrons.

Figure 3:
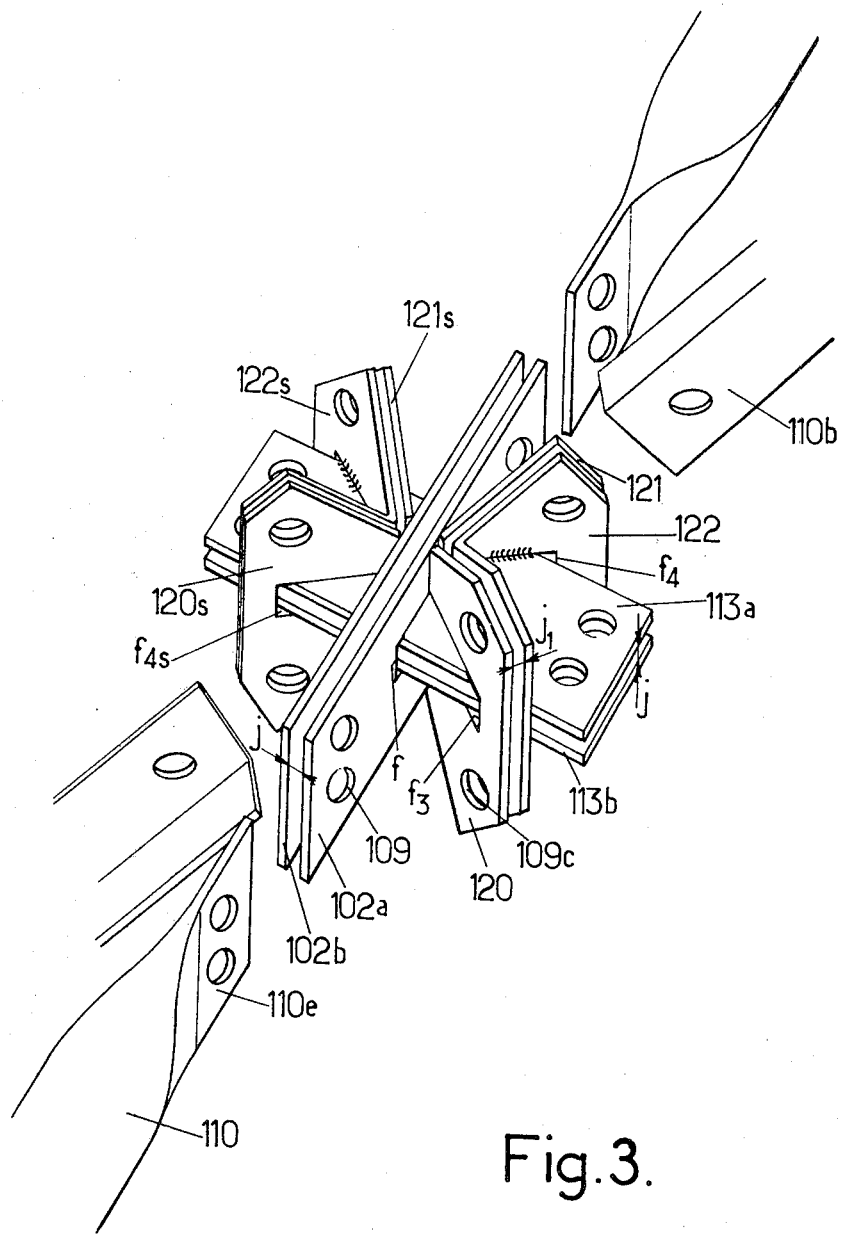
FIG. 3 shows another embodiment of the assembly node, in perspective.

As can be seen in FIG. 3, each flat element may be associated with another flat element spaced therefrom in a direction orthogonal to the plane thereof.

Thus, two flat elements 102a, 102b are provided; these two flat elements are parallel and define therebetween a space j adapted to receive the end 110e of a bar 110 of the spatial structure; the end 110e comprises holes adapted to come opposite the holes 109 of elements 102a, 102b so as to allow securing by any appropriate means such as bolts, pins. Bar 110 may be a cylindrical bar whose end 110e has been flattened so as to engage in space j. Thus coupling of the bar is ensured exactly along a direction passing through the center of the node, avoiding offsetting of the fixing of the bar with respect to this direction.

The second flat element is also paired up with another and is formed by the assembly of parallel elements 113a, 113b spaced apart from one another so as to define also a space j.

These two elements 113a, 113b pass through the first two elements 102a, 102b which are each provided, in the middle of their width, with a longitudinal slit f closed at both its longitudinal ends. The width of slit f of FIG. 3 is sufficient to allow elements 113a, 113b spaced apart from another to pass therethrough; the different elements 102a, 102b, 113a, 113b are joined together along the solid angles of intersection of the dihedrons which they define.

It should be noted that the elements 113a, 113b of FIG. 3 do not have longitudinal slits; in the embodiment of this figure, this slit would not be used.

The assembly node is completed by additional flat elements for coupling up diagonal bars.

These additional flat elements are also paired up with others; they form two symmetrical groups with respect to the plane parallel to elements 102a, 102b and equidistant from these elements.

The group of additional flat elements situated on the right, of FIG. 3, with respect to the plane equidistant from elements 102a, 102b, comprises two external flat elements 120, 121 and a flat element 122 bent so as to form a dihedron.

Flat elements 120, 121 are orthogonal to the planes of elements 113a, 113b and form an angle, for example of 45°, with flat element 102a. Flat elements 120, 121 extend on each side of flat members 113a, 113b; each flat element 120, 121 comprises a slit such as f3 which encloses the two elements 113a, 113b, as can be seen in FIG. 3. This slit f3 is closed towards the outside, but opens onto the edges of element 120 in the direction of the center of the node. The same goes for element 121.

These elements 120, 121 are in contact, towards their inner end, with the surface of element 102a.

The inner element 122 is bent, especially at right angles, so as to form a dihedron whose two faces are parallel, respectively, to elements 120, 121; however, the faces of the dihedron 120 are spaced apart from elements 120, 121 so as to define therebetween a space j1 adapted to receive the end of a diagonal bar, such as 110b.

Flat element 122 bent so as to form a dihedron comprises, in the middle of the width of the solid angle of intersection of the dihedron, a slit f4, closed at both its ends, intersecting the solid angle of intersection of the dihedron and extending over a part of each face of the dihedron, in a direction perpendicular to the solid angle of intersection.

The slit f4 has dimensions sufficient to allow the assembly of elements 113a, 113b, spaced apart from one another, to pass therethrough, as can be seen in FIG. 3.

Elements 120, 121, 122 are joined to the other elements of the assembly node along lines formed by the solid angles of intersection of the different dihedrons or trihedrons defined by these elements.

Elements 120, 121, 122 comprise coupling means formed especially by holes 109c for different diagonal bars.

The additional elements situated on the left of FIG. 3, with respect to flat element 102b, follow from elements 120, 121, 122 because of the symmetry mentioned above. The description of these elements is not made again; the elements in question are designated by the same references, followed by the letter "s."

The combination of the first flat element 102 or 102a, 102b having a longitudinal slit in the middle of its width, with the second flat element 113 or 113a, 113b, passing through this slit, allows an assembly node to be obtained transmitting forces under good conditions.

In fact, the small dimension of the slit of the first flat element 102 or 102a, 102b is orientated transversely and, preferably, perpendicularly to the direction of the forces transmitted by the flat element.

The result is that the effective section of the material of the flat element working under traction or compression is only slightly reduced at the level of the slit, the width of this slit being only equal (or substantially equal) to the thickness of the flat element or of the assembly of flat elements which pass therethrough.

In the case where the second flat element 113 does not have a slit f2, the keys C1, C2, shown in FIG. 2, are no longer used.

The additional flat elements such as 105, 105a are then fixed to the faces of the dihedrons formed by elements 102, 113. The two flat elements 105, 105a could form the faces of a dihedron obtained by bending a plate along a solid angle of intersection which would be applied, for example, against the flat element 113, so as to be fixed thereto.

I claim:

1. An assembly node for a spatial structure comprising:
at least one flat first element having a slit situated substantially in the middle of the width of said first element and being oriented in the longitudinal direction; and
at least one flat second element engaged in said slit and passing therethrough, said first and second elements of the node being joined together along the edges of said slit, wherein
said slit is provided in said first element so that the transmission of forces on each side of the center of the node, in the longitudinal direction of said first element, is ensured by continuity of the material of said first element, said slit passing through the point of convergence of the difference forces exerted on the node, the width of said slit being transversely oriented to the direction of transmission of forces, said second element passing through said slit and including means defining holes for allowing bars to be fixed thereto, the axis of said bars being situated in the plane of said second flat element on each side of said first flat element when fixed to respective ones of said holes.

2. Assembly node according to claim 1, wherein said first flat element extends along the longitudinal direction of said slit to dispose areas of said first element on each side of said second flat element and further comprises securing means for securing bars on each side of said second flat element in the longitudinal direction of said slit so that the transmission of forces by said first flat element on each side of the center of the node is effected essentially parallel to the longitudinal direction of the slit.

3. Assembly node according to claim 1 or 2 wherein said first flat element defines a longitudinal slit closed at both ends and having length and width dimensions sufficient to allow the introduction of said second flat element therein.

4. Assembly node according to claim 1 wherein said first and second flat elements are identical to one another.

5. Assembly node according to claim 2 wherein the width of said second element is oriented parallel to the length of said first element, said first and second elements being orthogonal to one another.

6. Assembly node according to claim 2 further comprising additional flat elements having means defining tilted portions joined to said first and second elements for permitting coupling of diagonal bars thereto.

7. Assembly node according to claim 6, wherein said additional flat elements are orthogonal to the plane of said second element and extend on each side thereof, each of said additional flat elements including an inner flat element and a pair of outer flat elements together defining a slit having an open end disposed towards the center of said node and a closed opposing end, said slit enclosing said second flat element, said inner flat element being bent so as to form a dihedron whose two faces are parallel, respectively, to said pair of outer elements.

8. An assembly node comprising:
at least one flat first element including a pair of coplanar flat first members situated parallel to one another and spaced apart to define a continuous slit therebetween, said slit situated substantially in the middle of the width of said first element and being oriented in the longitudinal direction; and
at least one flat second element engaged in said slit and passing therethrough, said first and second elements being joined together along the edges of slit, wherein said slit is provided in said first element so that transmission of forces on each side of the center of the node, in the longitudinal direction of said first element, is ensured by continuity of the material of said first element, said slit passing through the point of convergence of the different forces exerted on the node, the width of said slit being transversely oriented to the direction of transmission of forces, said second element passing through said slit and including means defining holes for allowing bars to be fixed thereto, the axis of said bars being situated in the plane of said second flat element when fixed to respective ones of said holes.

9. Assembly node according to claim 8 wherein said first flat element extends along the longitudinal direction of said slit on each side of said second flat element and further comprises securing means on each side of said second flat element for securing bars thereto in the longitudinal direction of said slit so that the transmission of forces by said first flat element on each side of the center of the node is effected essentially parallel to the longitudinal direction of said slit.

10. Assembly node according to claim 8 or 9 wherein said second flat element includes a pair of coplanar flat second members situated parallel to one another and spaced apart from one another to define a second slit.

11. Assembly node according to claim 10 further comprising a third flat element including a pair of coplanar flat third members situated parallel to one another and spaced apart from one another to define a third slit, said pair of third members disposed in said second slit and said pair of first members disposed in said third slit.

12. Assembly node according to claim 11 wherein said pairs of first, second and third members are identical to one another.

13. An assembly node comprising:
at least one flat first element defining a first slit situated substantially in the middle of the width of said first element and being oriented in the longitudinal direction;

at least one flat second element engaged in said first slit and passing therethrough, said second element defining a longitudinal slit closed at both ends disposed substantially in the middle of the width of said second element, the length of said second slit being at least equal to the width of said first element so that portions of said second slit extends on each side of said first element when said second element is engaged in said first slit; and key members disposed in said portions of said second slit for locking said assembly node and being situated in planes substantially orthogonal to the solid angles of intersection of the dihedrons formed by said first and second elements, at least one of said key members having a sloped area and including coupling means on said area permitting coupling of diagonal bars to said at least one key member, wherein said first slit is provided in said first element so that the transmission of forces on each side of the center of the node, in the longitudinal direction of said first element, is ensured by continuity of the material of said first element, said first slit passing through the point of convergence of the different forces exerted on the node, the width of said first slit being transversely oriented to the direction of transmission of forces, said second element passing through said first slit and including means defining holes for allowing bars to be fixed thereto, the axis of said bars being situated in the plane of said second flat element on each side of said first flat element when fixed to respective ones of said holes.

14. An assembly node comprising:

at least one pair of parallel, spaced apart flat first elements defining therebetween a space for receiving a bar and having a slit situated substantially in the middle of the width of said first element and being oriented in the longitudinal direction;

at least one pair of parallel, spaced apart flat second elements engaged in said slit and passing therethrough, said pair of second elements defining therebetween a space for receiving a bar, said first and second elements of the node being joined together along the edges of said slit; and means associated with said first and second pairs of elements for securing selected ones of said bars thereto so that transmission of forces on each side of the center of the node is effected essentially parallel to the longitudinal direction of the slit, wherein said slit is provided in said first element so that the transmission of forces on each side of the center of the node, in the longitudinal direction of said first element, is ensured by continuity of the material of said first element, said slit passing through the point of convergence of the different forces exerted on the node, the width of said slit being transversely oriented to the direction of transmission of forces, said second element passing through said slit and including means defining holes for allowing bars to be fixed thereto, the axis of said bars being situated in the plane of said second flat element on each side of said first flat element when fixed to respective ones of said holes, said first element extending along the longitudinal direction of said slit to dispose areas thereof on each side of said second element.

15. Assembly node according to claim 14 further comprising additional flat elements having means defining tilted portions joined to said first and second elements for permitting coupling of diagonal bars thereto.

16. Assembly node according to claim 15, wherein said additional flat elements are orthogonal to the plane of said second elements and extend on each side thereof, each of said additional flat elements including an inner flat element and a pair of outer flat elements together defining a slit having an open end disposed towards the center of said node and a closed opposing end, said slit enclosing said second flat element, said inner flat element being bent so as to form a dihedron whose two faces are parallel, respectively, to said pair of outer elements.

17. A spatial structure formed with a plurality of interconnected assembly nodes in accordance with claim 1, 8, 13 or 14.

* * * * *